United States Patent [19]

Matich

[11] Patent Number: 5,833,796
[45] Date of Patent: Nov. 10, 1998

[54] METHOD AND APPARATUS FOR FORMING STRUCTURAL ARTICLES

[75] Inventor: Frank Anthony Matich, New South Wales, Australia

[73] Assignee: Armacel Pty Limited, Mona Vale, Australia

[21] Appl. No.: 549,699

[22] PCT Filed: Feb. 28, 1995

[86] PCT No.: PCT/AU95/00100

§ 371 Date: Mar. 29, 1996

§ 102(e) Date: Mar. 29, 1996

[87] PCT Pub. No.: WO95/23682

PCT Pub. Date: Sep. 8, 1995

Related U.S. Application Data

[63] Continuation-in-part of Ser. No. 272,531, Jul. 11, 1994, abandoned.

[30] Foreign Application Priority Data

| | | | |
|---|---|---|---|
| Mar. 4, 1994 | [AU] | Australia | PM4258 |
| Aug. 11, 1994 | [AU] | Australia | PM7413 |
| Nov. 10, 1994 | [AU] | Australia | PM9374 |

[51] Int. Cl.⁶ .................................................. B29C 65/70
[52] U.S. Cl. .......................... 156/285; 156/212; 156/382; 2/425
[58] Field of Search .......................... 156/212, 475, 156/285, 382; 2/425

[56] References Cited

U.S. PATENT DOCUMENTS

| | | | |
|---|---|---|---|
| 3,654,012 | 4/1972 | Schlager | 156/212 |
| 4,615,438 | 10/1986 | Rosenberg et al. | 206/223 |
| 4,769,100 | 9/1988 | Short et al. | |
| 4,894,102 | 1/1990 | Halls et al. | 156/212 |
| 5,034,077 | 7/1991 | Pata | |
| 5,201,981 | 4/1993 | Whiteside | 156/212 |

FOREIGN PATENT DOCUMENTS

| | | | |
|---|---|---|---|
| 78638 | 6/1988 | Australia . | |
| 894104 | 12/1982 | Belgium . | |
| 2507443 | 12/1982 | France . | |
| 2404599 | 8/1974 | Germany . | |
| 51-54669 | 5/1976 | Japan | 156/212 |
| 54-119565 | 9/1979 | Japan . | |
| 7031527 | 2/1982 | Japan . | |
| 3214424 | 9/1988 | Japan . | |
| 3034838 | 2/1991 | Japan . | |
| 3150126 | 6/1991 | Japan . | |
| 5131545 | 5/1993 | Japan . | |
| 2103468 | 2/1983 | United Kingdom . | |

*Primary Examiner*—Francis J. Lorin
*Attorney, Agent, or Firm*—Leydig, Voit & Mayer, Ltd.

[57] ABSTRACT

The present invention discloses structural articles such as helmets, cooler chests, pallets, building boards and a large number of diverse articles all formed from an inner, preferably air permeable, body to which a structural strength imparting skin or layer has been applied to either a single surface or opposite surfaces. The body can be expanded polystyrene, wood, particle board, cellulosic fiber cement, GECET or CARIL. The sheet or skin can be acrylonitrile butadiene styrene (ABS), polyester, styrene, or polycarbonate. Amorphous polyester (APET) is particularly preferred. A method of forming such structural articles and apparatus for use in carrying out the method are also disclosed.

45 Claims, 12 Drawing Sheets

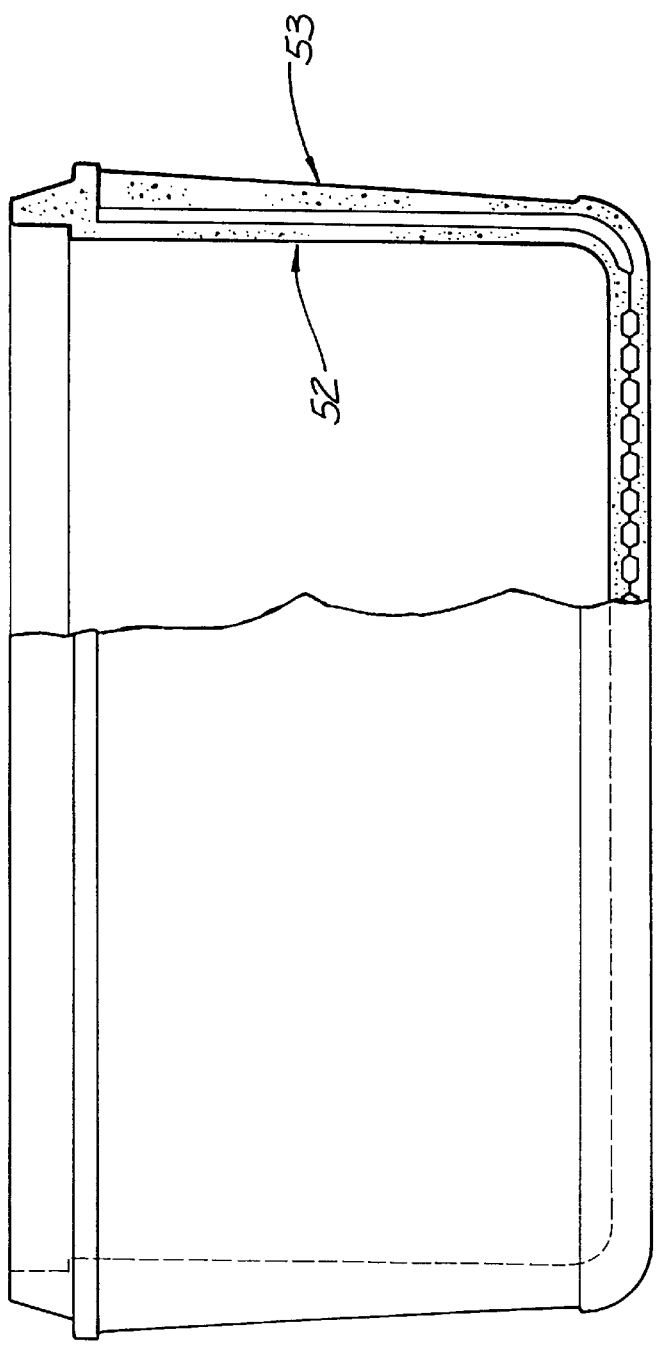
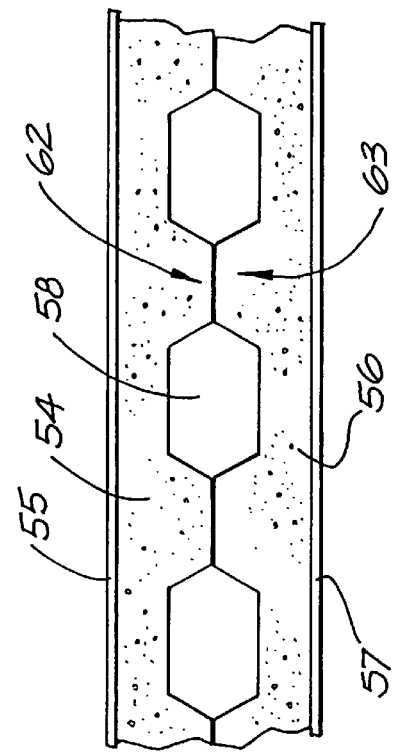
FIG. 17
FIG. 18

METHOD AND APPARATUS FOR FORMING STRUCTURAL ARTICLES

This is a 371 of PCT/AU95/00100, filed Feb. 28, 1995, published as WO95/23682 Sep. 8, 1995, which is a CIP of Ser. No. 08/272,531 filed Jul. 11, 1994 abn.

TECHNICAL FIELD

The present invention relates to a method and apparatus for forming a structural covering on an article. The invention also relates to the articles formed thereby which include such a structural covering.

The invention has been developed for applying structural coverings to helmets and will be described hereinafter with reference to that and other applications. However, it will be appreciated that the invention is not limited to those particular fields of use. As will be explained hereafter the invention is also applicable to other articles including pallets, cooling chests or hot boxes, storage containers for fragile articles such as computers, and structural articles including building components and form work, especially in relation to the cool or hot storage of goods.

BACKGROUND ART

Hitherto, bicycle helmets in particular have been constructed from a light weight energy absorbent material. Although such helmets provide some degree of protection they lack penetration resistance and as such are easily damaged in accidents at the first impact.

Additionally, these helmets are easily stained and discoloured by dirt, grease, oil and the like. As a result such helmets quickly become aesthetically displeasing.

To overcome the problems of discolouring, outer fabric coverings have been used. For example many lycra coverings are available which can be easily removed from the helmet and cleaned as required. Alternative arrangements include a external plastics covering which is separately injection moulded, vacuumed formed or the like and subsequently abutted against the light weight helmet body and held by way of a surface adhesive or adhesive tape. Such methods of applying the covering are time consuming, either labour or capital intensive and produce a large number of defective units.

In particular answer to this problem, a separately vacuum formed or injection moulded covering has been inserted into the mould prior to the formation of the energy absorbent helmet body. Although the labour requirement is reduced, there is shrinkage of the body during the moulding process. Also the lack of adherence between the covering and body can result in a loose fit.

In addition, these coverings are only capable of extending to a mould line otherwise it would not be possible to withdraw the finished product from the mould.

The types of coverings available contribute minimally to the safety of the helmet as a whole and effectively only offer aesthetic advantages. Any impact performance is provided by the helmet body, and not the cover itself.

In the field of grand prix, motorcycle and moped helmets where higher impact forces are encountered, prior art helmets tend to be heavy and expensive. For example, it is known to utilise a polycarbonate or reinforced fibreglass outer shell and a separate inner liner which must be subsequently installed within the shell.

In other fields, the use of structural components in general requires utilising heavy and expensive materials such as timber, steel or the like. The weight and expense are often increased where corrosion resistance is important. Examples of such articles are pallets used in the transportation of goods and metal clad insulated enclosures such as coolers, refrigerators and the like. Furthermore, some materials such as timber used for pallets and for formwork for concrete and other materials that require support during curing, are becoming increasingly scarce and therefore expensive.

In other fields such as portable coolers or ice chests (such as those sold under the well known trade mark ESKY or ESKIE in Australia), the product suffers severely from a lack of mechanical strength. Such products have hitherto been moulded from expanded polystyrene and although of a low cost construction are easily cracked or broken. For example, a grown man cannot normally sit or stand on such a product without it breaking.

Further in the building arts it is known to use cellulose fibre cement buildings boards (which have replaced asbestos fibre cement or "fibro" boards). However such boards or cladding, whilst of low cost and adequate strength once installed, are liable to breakage during transport and installation. Furthermore, the appearance of such cladding is overwhelmingly drab and such cladding has not been able to compete with coloured metal cladding such as that sold under the Australian registered trade marks COLOUR-BOND and ZINCALUME. It would therefore be desirable if the structural strength and appearance of such building boards were improved.

It is an object of the present invention to substantially overcome or ameliorate at least some of these deficiencies of the prior art.

SUMMARY OF THE INVENTION

According to a first aspect of the present invention there is disclosed a method of forming an article having load bearing capabilities from a shape defining interior member and at least one external skin, said method comprising the steps of:

1. heating a plastics sheet intended to form said external skin,
2. bringing the heated sheet alongside the interior member to overlie same,
3. applying a fluid pressure differential between opposite sides of said interior member and said sheet to conform said sheet to the shape of said interior member and mutually engage same, and
4. cooling said sheet or allowing same to cool.

If desired both, or all, surfaces of the interior member can be covered with a corresponding skin. The fluid is preferably gas rather than a liquid and air is especially useful.

According to a second aspect of the present invention there is disclosed apparatus for forming an article having load bearing capabilities from a shape defining interior member and at least one external skin, said apparatus comprising:

1. a sheet holding device to hold a sheet of plastics material around its periphery or adjacent a pair of opposite edges thereof,
2. a former to hold and support a shape defining member,
3. translation means to move said former relative to said sheet holding device to move said sheet and shape defining member together,
4. heating means to heat a plastics sheet held in said sheet holding device to at least partially soften said sheet, and
5. pressure differential means to create a pressure differential between said sheet and member to conform said sheet to said member.

Preferably a cooling system is provided which faces that side of said sheet not engaged with said member to cool said sheet after its engagement with said member.

Preferably, the shape defining member or body is sufficiently permeable to allow air to be drawn through the body in response to the pressure differential. The preferred body is an open matrix material, although other embodiments include a plurality of spaced apart vents extending between the interior and exterior sides of the body to facilitate the conforming of the sheet to the exterior of the body.

Preferably also, the interior and exterior surfaces of the body terminate at a common peripheral edge and the sheet is brought into engagement with at least some of that edge. The sheet is also preferably brought into captive engagement with at least some of the interior side.

Preferably, the creation of a pressure differential involves the establishment of a low pressure region on the interior side of the body. Alternatively, a high pressure region can be established on the exterior side of the body. Both regions can also be simultaneously created.

Preferably, as the sheet cools (or is cooled) it tensionally engages the body. Preferably the sheet sufficiently raises the temperature of the immediately adjacent body surface to allow some softening thereof which in turn facilitates a laminate bonding, or composite union, or welding between the sheet and body. A rough or grained surface of the body creates an improved bond possibly due to increased closer frictional fit.

Preferably the shape defining member consists of expanded polystyrene, however, as will become more evident hereinafter with respect to the description of the preferred and other embodiments, depending on the application, the shape defining member can readily include other materials such as cardboard, particle board, cellulosic fibre cement timber, other forms of plastics and other porous or air permeable substances. Additionally the shape defining member can extend to include non-porous substances which have been rendered porous or air permeable by having a series of spaced holes or apertures placed therethrough or therein. By progressive application of the softened sheet to the member, the whole of the pressure ultimately comes to bear on both to a join therebetween.

Preferably, the sheet is selected from one or a combination of the following materials: acrylonitrite butadiene styrene; polyester; styrene; polycarbonate; PET; APET; PETG; PVC; copolymer polyester/polycarbonate; and HDPE.

Preferably, the sheet is cooled by passing cold air or the like over the completed article. A slower alternative, and therefore less desirable, is to simply let the article stand at room temperature. If the body is dense it is desirable to maintain heat to the sheet as it is being formed into its final shape. It is desirable to cool the sheet quickly when it reaches its final shape to prevent subsequent expansion of the individual beads of any EPS body, these beads being essentially welded together. If necessary a water spray can be used.

In one preferred form the exterior side of the body has applied thereto a heat activated bonding agent for furthering the engagement between the body and covering.

Preferably also, two or more coverings are sequentially formed on the body.

In accordance with a third aspect of the present invention there is disclosed a cooling chest or hot box constructed from articles formed in accordance with the method of the first aspect of the present invention.

In accordance with a fourth aspect of the present invention there is disclosed a hot or cold store constructed from modular components, said modular components constructed in accordance with the method of the first aspect of the present invention.

BRIEF DESCRIPTION OF THE DRAWINGS

Several embodiments of the present invention will now be described with reference to the drawings in which:

FIG. 17 is a perspective view, partly in section, of a second side of the base portion of the cooling chest of FIG. 14, FIG. 18 is an exploded view of a portion of FIG. 17.

DETAILED DESCRIPTION

Figure 1:
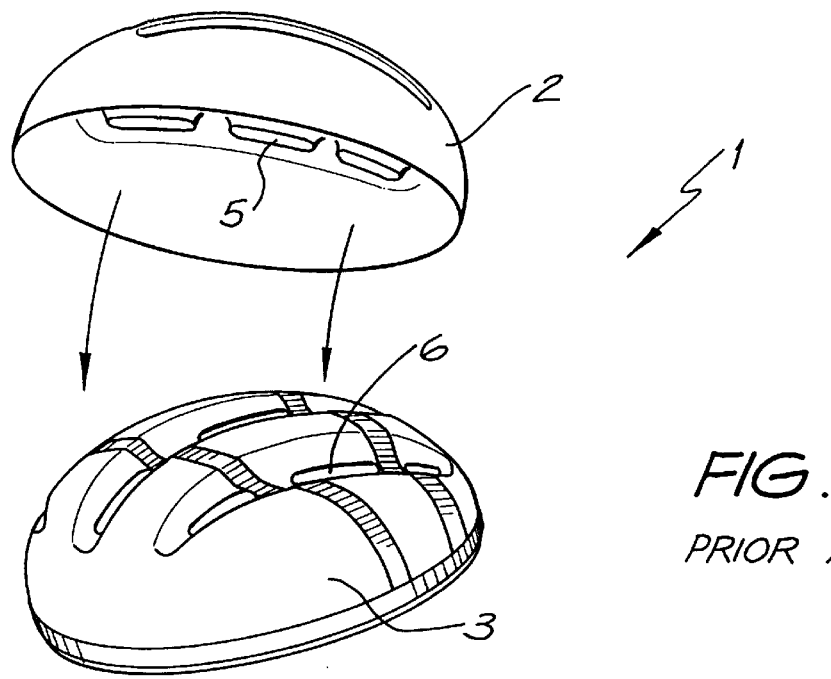
FIG. 1 is an exploded perspective view showing a prior art method of assembly of a safety helmet.
Figure 2:
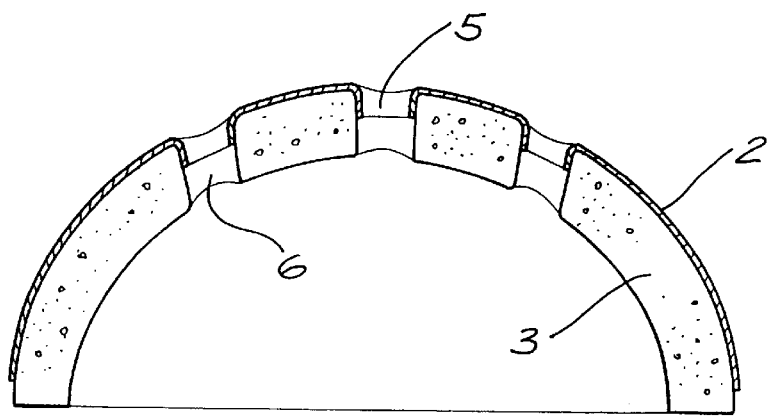
FIG. 2 is a transverse cross sectional view of the partly assembled helmet of FIG. 1.
Figure 3:
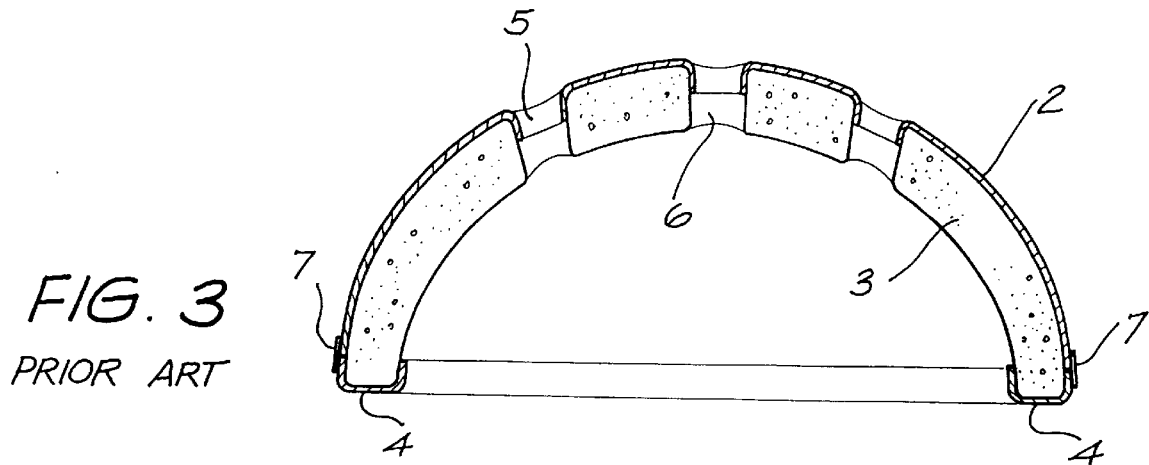
FIG. 3 is a view similar to FIG. 2 but illustrating the completed helmet.

Referring now to FIGS. 1–3, the prior art helmet 1 is formed from three piece s namely an outer covering 2, an inner body 3, and a lower rim piece 4 (FIG. 3).

The inner body 3 is moulded from polystyrene or other light weight plastics material which is crushable so as to absorb energy. This is covered by an outer covering 2 which is moulded or vacuum formed so as to mate with the upper surface of the body 3. As indicated in FIG. 2, the outer covering 2 can be provided with various sleeves 5 which fit partially into apertures 6 formed in the body 3. However, in order that the covering 2 be able to be removed from its mould, it is necessary that the sleeves 5 not protrude too far.

As indicated in FIG. 3, once the covering 2 has been placed over the body 3, and adhered thereto by means of a suitable adhesive, a rim piece 4 can be placed around the lower periphery of the inner body 3 and adhered thereto by means of a suitable adhesive. The join between the outer covering 2 and rim piece 4 is covered by means of a strip of adhesive tape 7. Alternatively, a relatively wide strip of adhesive tape is pressed over the free edge of the covering 2 and the rim of the body 3. This completes the prior art helmet.

The prior art helmet suffers from a number of disadvantages not the least of which is that it is not particularly strong. Although the outer covering 2 provides some independent load distributing ability, it is not essentially strong in its own right and is often easily deformed, thereby giving rise to low penetration resistance. Furthermore, the assembly of the rim piece 4 is time consuming and the use of an adhesive tape to cover the narrow opening between the upper edge of the rim piece 4 and the lower edge of the outer covering 2 is both time consuming and gives rise to various design constraints as to the overall appearance of the helmet. Partial coming loose of the adhesive tape 7 is also normally the first sign of wear of such a helmet.

Figure 4:
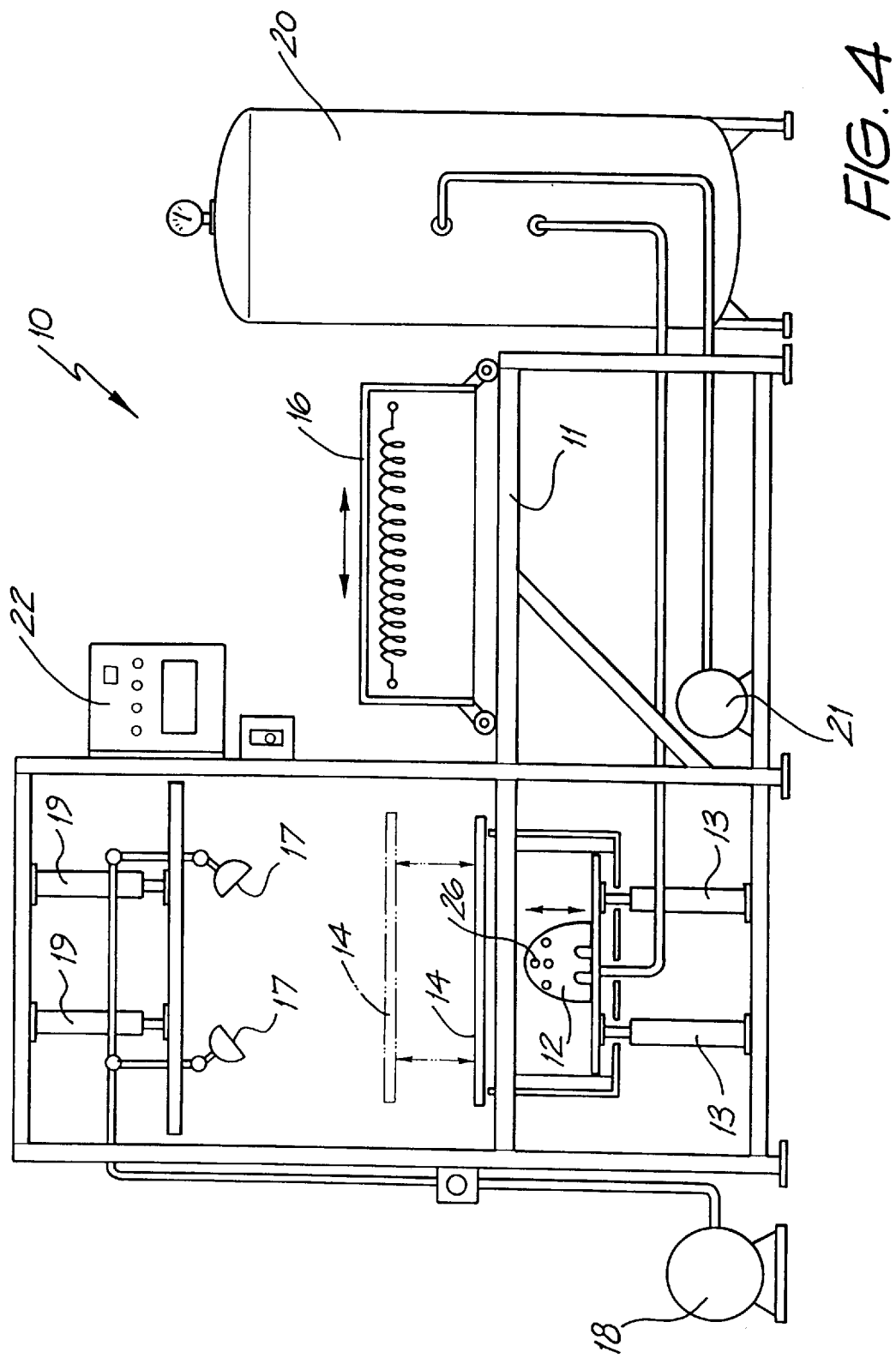
FIG. 4 is a schematic elevation of the apparatus of the preferred embodiment.

By utilising the apparatus illustrated in FIG. 4, a helmet which is superficially similar to, but structurally vastly different from, the helmet of FIGS. 1–3, can be fabricated. As illustrated in FIG. 4 the apparatus 10 takes the form of a support frame 11 on which is mounted a reciprocal former 12 which is reciprocated by means of pneumatic or hydraulic cylinders 13. Located above the former 12 is a clamping device 14 which is able to clamp a sheet 15 of plastics material around its periphery.

A heater 16 is mounted on wheels and is rollable along the support frame 11 so as to be either located above, or away from, the clamping device 14. Positioned above the clamping device 14 is a pair of nozzles 17 which are connected to an air pump 18. The nozzles 17 are reciprocal by means of pneumatic or hydraulic cylinders 19.

The former 12 is connected to an evacuated tank 20 which is evacuated by means of an air pump 21. The various items of equipment are controlled by a conventional controller 22 incorporating programmable logic controllers.

Figure 5:
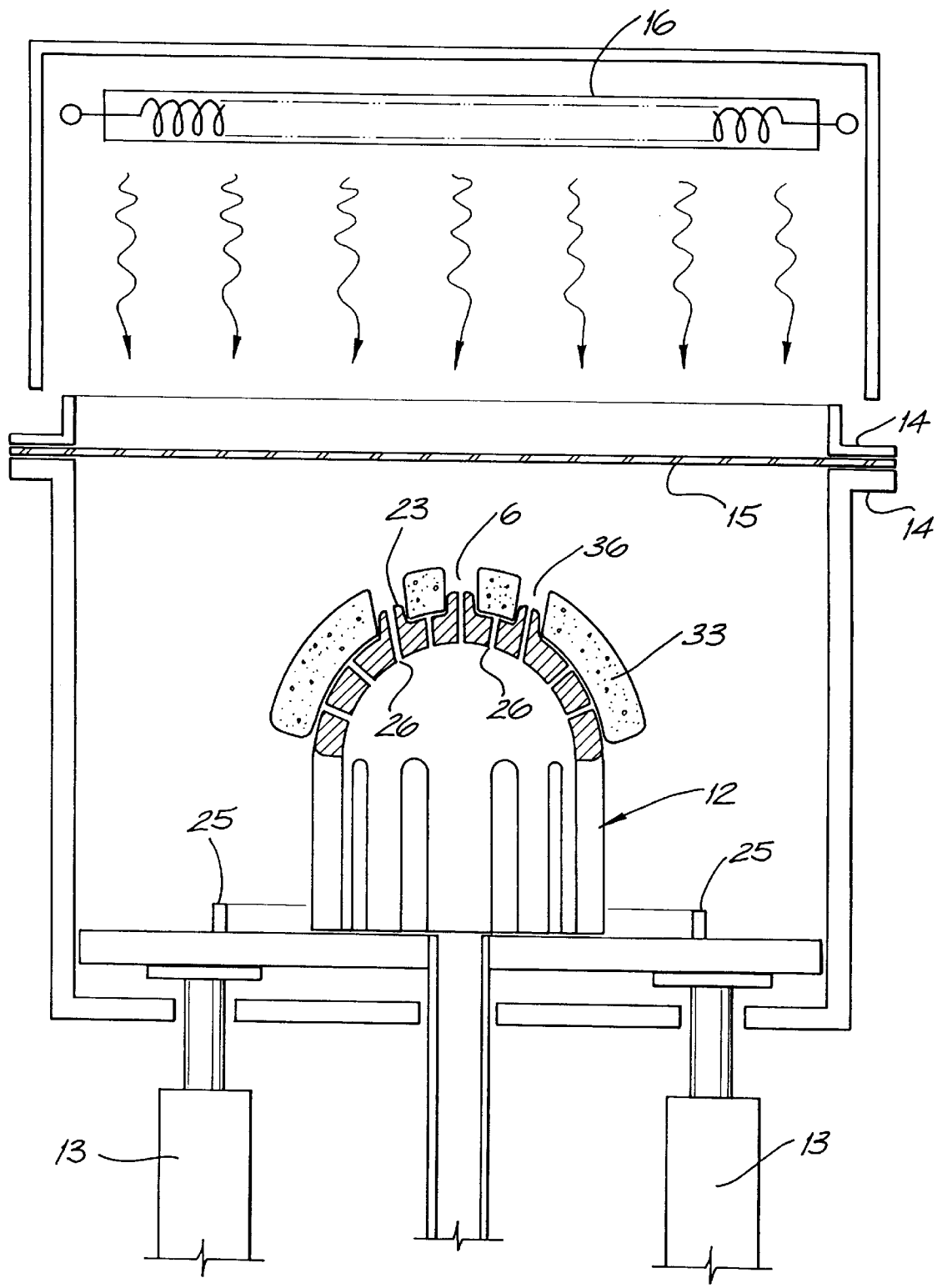
FIG. 5 is an elevational view of the apparatus of FIG. 4 during an initial process step.

As seen in FIG. 5, an inner body 33 formed from expanded polystyrene (EPS) having a plurality of apertures 36 as before, is placed on the former 12. A number of projections 23 locate into the corresponding apertures 6. A plastics sheet 15 is clamped in the clamping device 14 and the resistive heater 16 is rolled into position so as to warm the plastic sheet 15. After a predetermined time, the sheet 15 is heated to a desired temperature (typically 135° C.). The heater 16 is then retracted prior to the commencement of the next step. In places where the ambient temperature varies, or thicker sheets are used, preheating of the sheet to warm same can be used. In addition, both sides of the sheet can be heated.

Figure 6:
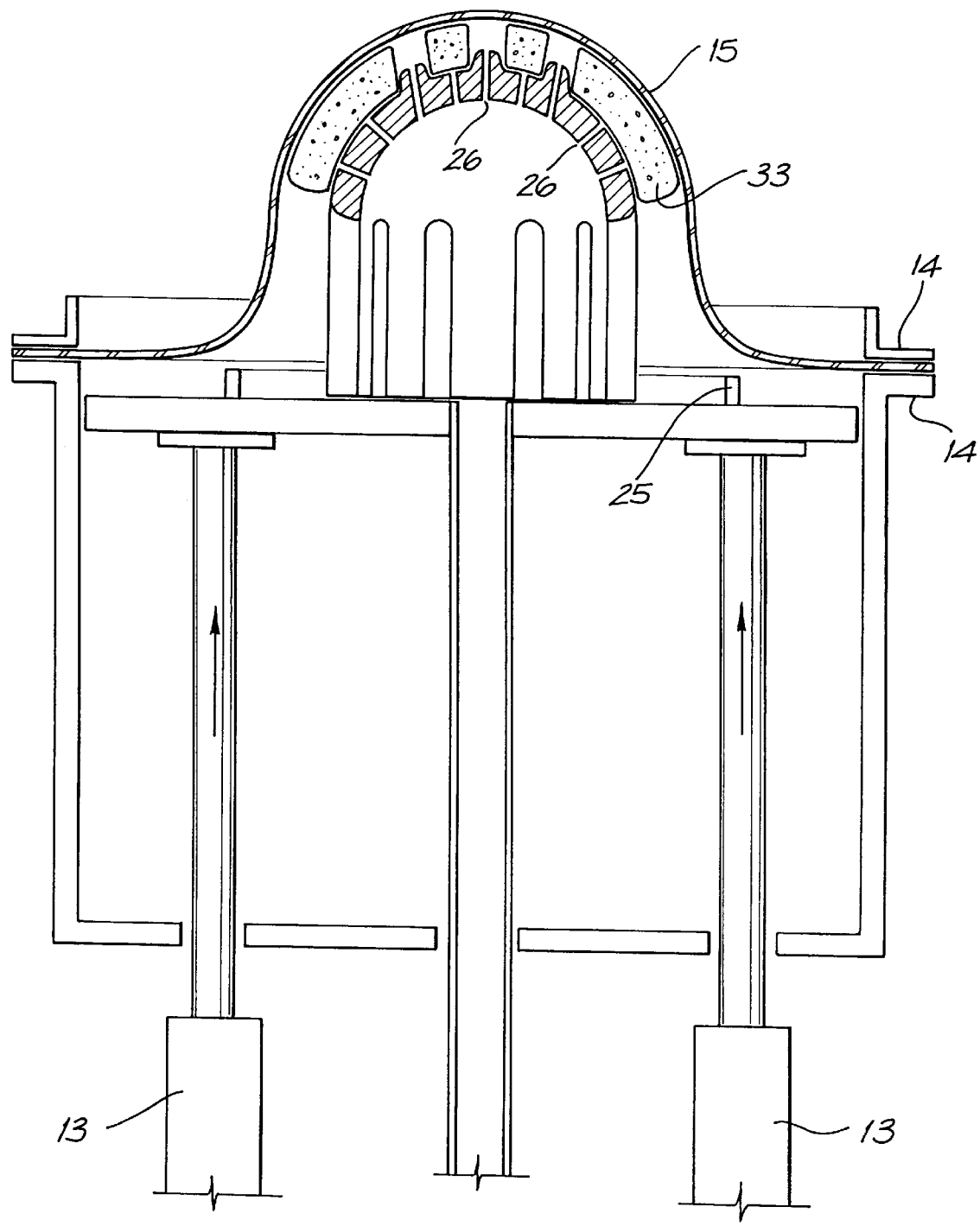
FIG. 6 is a view similar to FIG. 5 but illustrating the next process step.

Next, as illustrated in FIG. 6 the former 12 is moved upwardly by the pneumatic or hydraulic cylinders 13 thereby pushing upwardly on the heated sheet 15 by means of a layer of air trapped between the sheet 15 and the inner body 33, and also the former 12. This deformation of the heated sheet 15 substantially thins the sheet 15 in a substantially uniform manner.

Figure 7:
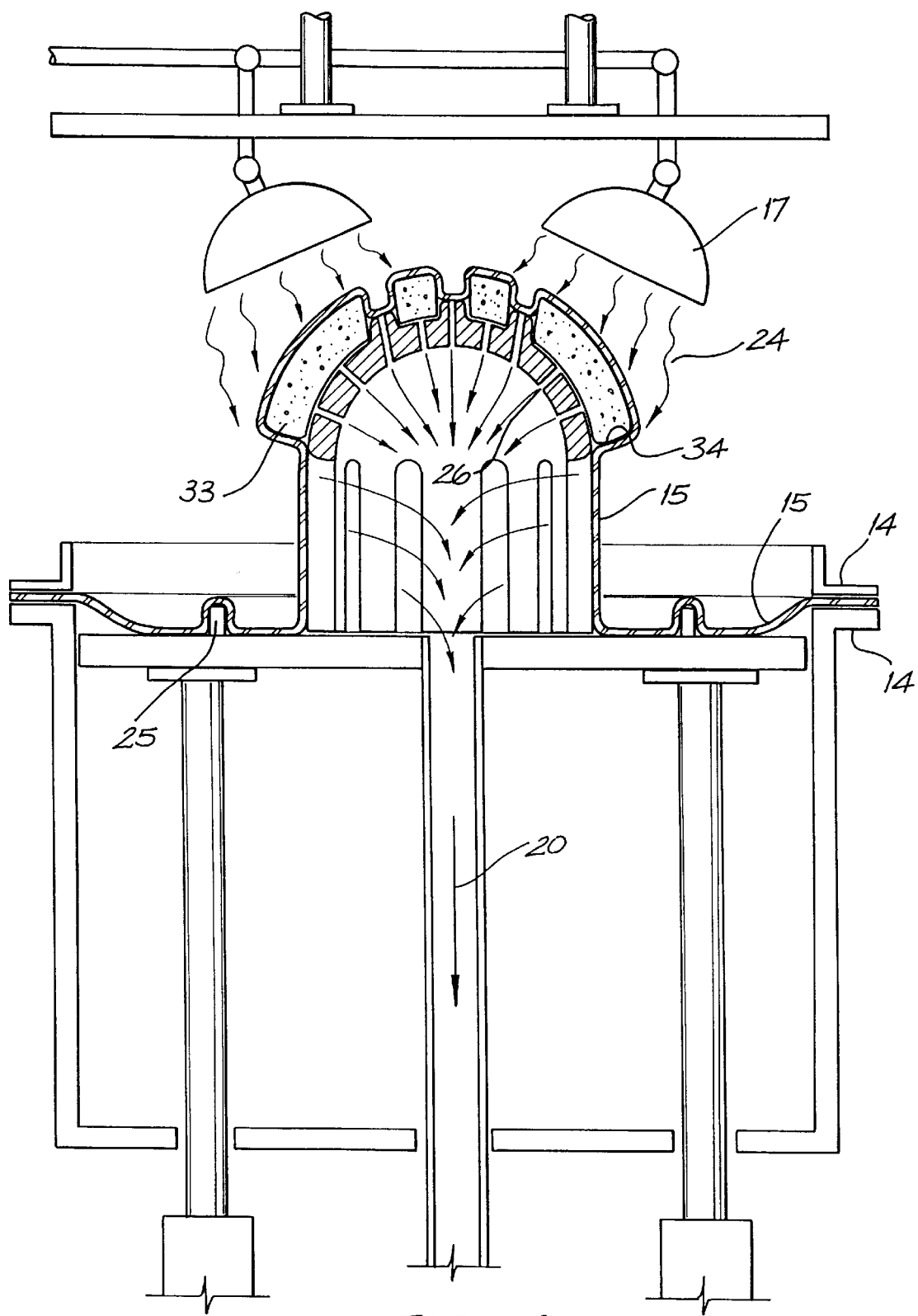
FIG. 7 is a view similar to FIG. 6 but illustrating the next process step.

As illustrated in FIG. 7, the next stage of the process is the application of the vacuum formed in the evacuated tank 20 to the former 12. This initially draws the air between the inner body 33 and sheet 15 through holes 26 in the former. As this air passes through the former 12, this abuts the sheet 15 with both the outer surface of the inner body 33 and an annular ring or annulus 25 in order to effectively seal the sheet 15 around the former 12.

In addition, the sheet 15 is forced inwardly by the pressure differential into the apertures 6 and around the lower rim 34 of the inner body 33. The penetration of the sheet 15 into the aperture 6 is limited by the projections 23 on the former 12.

Figure 8:
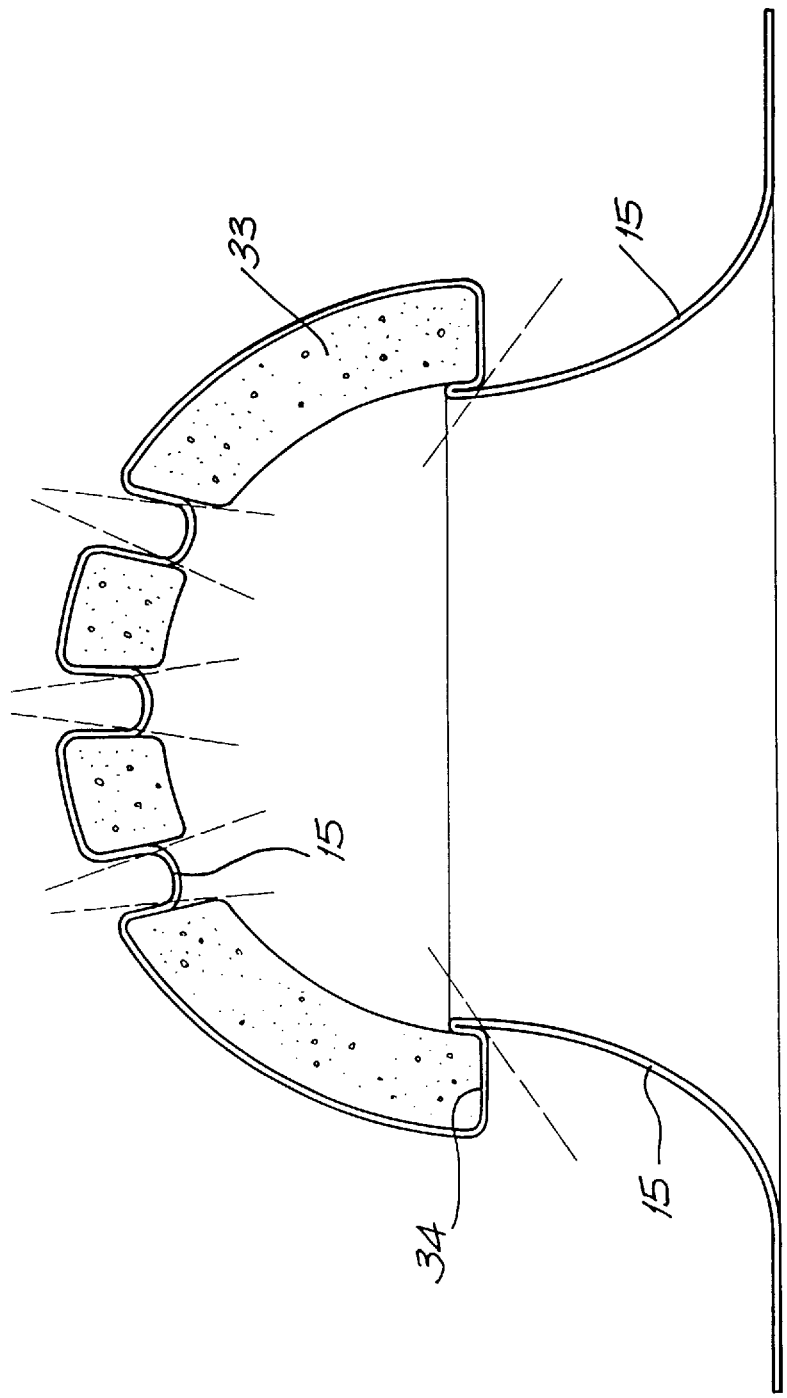
FIG. 8 is a view similar to FIG. 3 but illustrating the semi-completed helmet made in accordance with the apparatus of FIGS. 4–7.

Continued application of the vacuum to former 12 also draws air through the material of the inner body 33 which is preferably air permeable. This ensures that any air or other gas, which may be trapped between the sheet 15 and the inner body 33 is removed whilst the sheet 15 is still hot and therefore partially liquid. The heat of the sheet 15 enables it to form its bond with the inner body 33. The pressure differential eliminates the possibility of any bubbles forming under the sheet 15. In addition, as best illustrated in FIG. 8, the continued application of vacuum to the underside of the sheet 15 draws the sheet 15 around the edge of the lower rim 34 in a continuous forming action. This applies a substantial tensional force acting in all directions within the sheet 15. As a consequence, great structural strength is imparted to the eventual covered article.

Next the vacuum is switched off as the forming process is by this stage substantially complete. In order to prevent excessive heating of the EPS body 33, as indicated in FIG. 7 the nozzles 17 are lowered by the action of the pneumatic or hydraulic cylinders 19 and cooling air 24 is passed over the upper surface of the sheet 15. This action prevents the sheet 15 unduly heating the expanded polystyrene of the inner body 33.

The resulting covered body 33 is illustrated in FIG. 8 after the former 12 has been retracted by pneumatic or hydraulic cylinders 19 and the sheet 15 removed from the clamping device 14. This enables the semi-finished (ie. untrimmed) helmet to be removed and the remaining unwanted portions of the sheet 15 trimmed as necessary where indicated by dashed lines in FIG. 8.

Some preferred materials for the sheet 15 include acrylonitrite butadiene styrene (ABS), polyester, styrene and polycarbonate, or a combination of the foregoing. One particularly preferred material is amorphous polyester (APET). This material has high impact and tensile strengths and, in addition, is very durable. It is also resistant to oil and grease, gamma radiation and many solvents.

It will be appreciated by those skilled in the art that although the sheet 15 is brought into conforming engagement with the inner body 33 by means of application of a vacuum to the underside of the sheet 15, a similar result can be produced by the application of a positive pressure to the upperside of the sheet 15, the effect is to drive air through the inner body 33, rather than to draw the air through the body 33. One advantage of drawing air through the permeable inner body 33 is that in the event that the heat of the heated sheet 15 softens the EPS to the point where any gases, such as pentane, are liberated, then these gases can be safely evacuated via the tank 20 and air pump 21.

If desired, a bonding agent (preferably heat activated) can be applied to the outer surface of the inner body 33 in order to ensure a better bonding between the sheet 15 and inner body 33, however, generally speaking this is not necessary since the engagement is sufficiently intimate. Typically the thickness of the sheet 15 can range from 0.1 mm to 10 mm with preferred thicknesses being in the range 0.25 mm–3 mm and preferably 0.5–0.7 mm for bicycle helmets. A total cycle time of approximately 10–60 seconds is achievable. It will be apparent to those skilled in the art that multiple formers 12 can be provided relative to a single sheet 15, and that multiple stations can be provided, each of which increases the total output.

For those applications where a thicker sheet is used, or the permeability of the body 33 is reduced (for example because high density EPS is used) then a greater pressure differential can be created by applying a positive pressure to the upper surface of the sheet 15 and a vacuum to the lower surface of the sheet 15. The easiest way of pressurising the upper surface of the sheet 15 is by means of compressed air, however, a liquid can also be used.

In order to reduce the time taken for the covering to cool, the semi-finished, untrimmed, helmet is cooled by an air stream and more preferably a cold air stream.

An additional advantage of the above involves the provision for integral components within the helmet. For example, if the retention straps are installed before the covering is applied they will be captively retained between the shell and covering. This feature can be used to even greater advantage for motorcycle helmets where the mechanisms associated with the visor are able to be encased in the covering. When use is made of coverings which are water and chemical resistant they will effectively isolate these mechanisms from corrosion.

Further embodiments include threaded bushes which are embedded within body 33 prior to formation of the covering. Once the covering has been formed it can be appropriately pierced to allow attachment of articles to the helmet. For example, lights, battery packs, ear protectors, visors and the like are able to be appropriately removably attached.

The helmet formed from the abovementioned method can include further external coatings such as any one of a variety of epoxies or urethanes. Moreover, where the helmet is intended for high impact applications an additional high density shock absorbent layer is applied to covering 15 and the epoxy or urethane layer then applied to the exterior side of the high density layer.

In some embodiments, following the formation of covering 15 on body 33, a second like covering is formed by the same method. It has been found that the intimate engagement between two adjacent 0.75 mm coverings provides greater structural rigidity than a single 1.5 mm covering.

Use can be made of a heat activated or other adhesive between adjacent layers to further the laminate bonding.

If required, the plastics sheet 15 can be coloured or included printed matter. Alternatively, separate printed material can be captively maintained between body 33 and a transparent covering 15. Alternatively the body 33 can be painted or printed upon prior to undergoing the process. Furthermore, the plastic sheet can be painted or printed upon after undergoing the process.

The intimate bonding between the outer layer and the inner member results in a very substantial structural strength being imparted to the combination. In addition, by the simple expedient of reversing the inner body 33, it is possible to apply a sheet 15 to both sides of the inner body 33. When this is done it is desirable to apply a bonding agent to the region where the two sheets 15 overlap. Where the inner body is curved, it is desirable to cover the concave surface first, and cover the convex surface second. If desired, a needle or like tube can be inserted through the first applied sheet 15 in order to assist in the application of a vacuum to the body 33 during the application of the second sheet 15. A body 33 having two covering sheets 15 is illustrated schematically in FIG. 9. It will be understood that the inner body 33 can be shaped into any desired form including strengthening ribs, corrugations and the like.

Consequently, extremely strong and durable, yet very light articles of almost any configuration can be fabricated. Such articles have excellent mechanical strengths and shock absorbing properties such as dent resistance. Good thermal resistance is also exhibited. The strength to weight ratio of such articles is extremely high and this has a number of advantages such as the reduction in freight costs by using such articles as a support for, or container for, goods to be transported.

Figure 10:
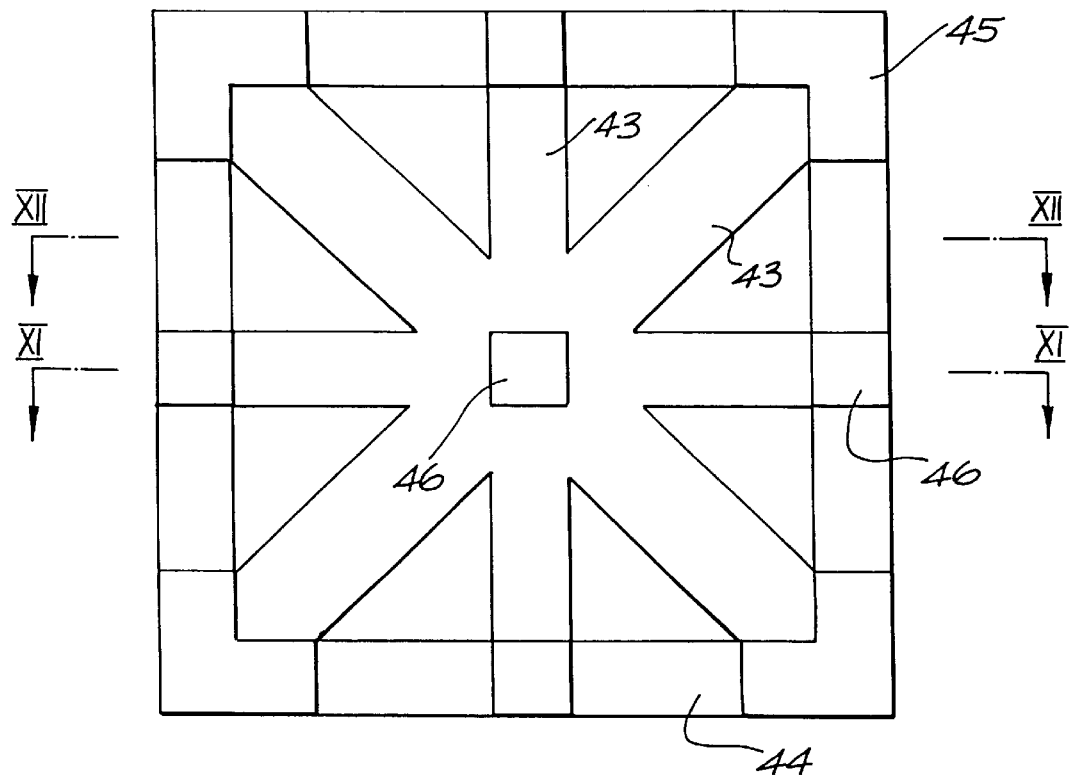
FIG. 10 is a plan view of the lower portion of a two part pallet.
Figure 11:
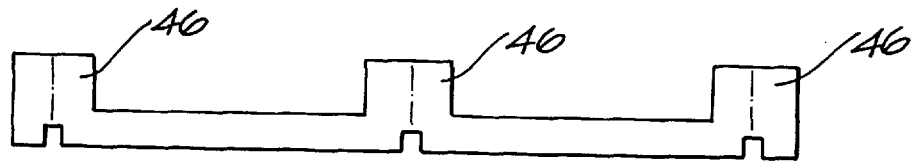
FIG. 11 is a transverse cross-sectional view taken along the line XI—XI of FIG. 10.
Figure 12:
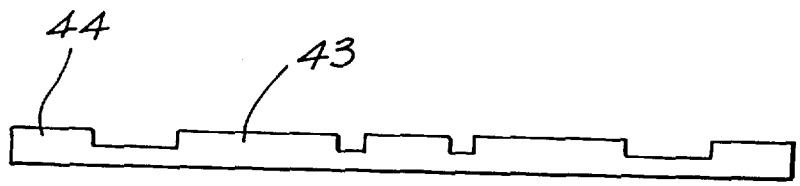
FIG. 12 is a cross-sectional view taken along the line XII—XII of FIG. 10.
Figure 13:
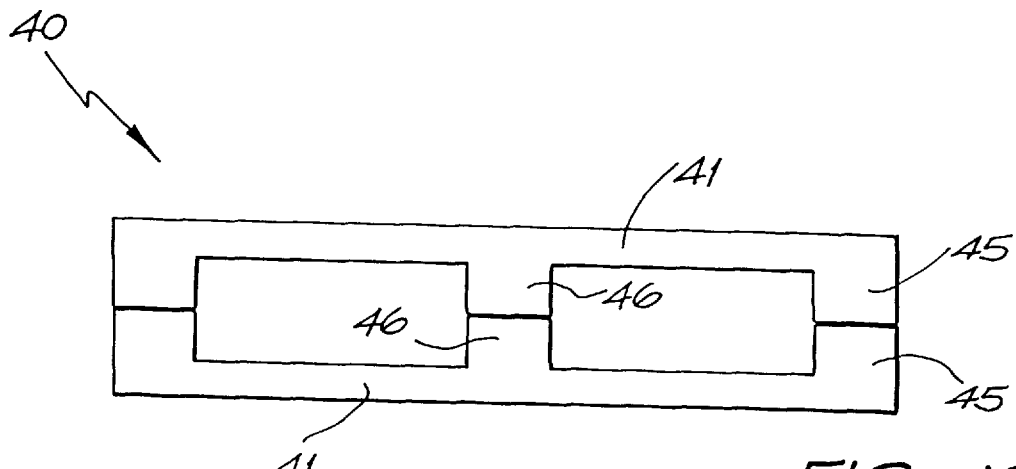
FIG. 13 is an end view of the assembled pallet formed by two of the portions illustrated in FIG. 10.

As illustrated in FIGS. 10–13, a pallet for use in the transportation and storage of goods, in particular by means of a forklift, can be fabricated. As illustrated in FIG. 13, the pallet 40 is formed from two identical halves 41 bolted together. One of the pallet halves 41 is illustrated in FIG. 10 in inverted form.

As will be apparent from FIGS. 10–12, the outer surface of the pallet 41 is smooth save for recesses 42 which receive the head of a tightening bolt and its corresponding nut (not illustrated). The inner side of the pallet half is provided with eight strengthening ribs 43 arranged in an upright cross and diagonal cross configuration. A strengthening rib 44 is also provided extending around the periphery of the pallet half 41.

In the four corners of pallet half 41, four L-shaped bosses 45 are provided and five rectangular bosses 46 are provided in the centre of the pallet half 41 and at the centre of each side.

As will be apparent from FIG. 13, the pallet 40 is formed by opposing two like pallet halves 41 to thereby form the finished article.

Figure 9:
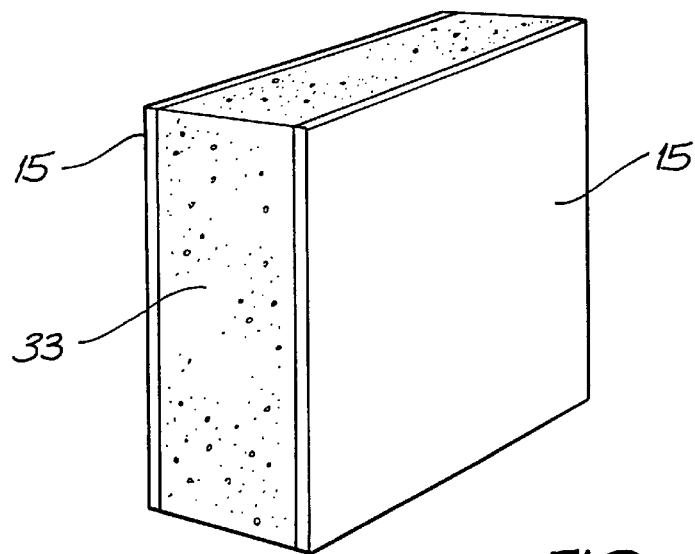
FIG. 9 is a schematic view of a portion of a sheet material.

It will also be apparent from FIG. 9 that the sandwich like material formed by use of two layers of plastic sheet 15 can be used to replace somewhat similar laminates, for example that formed by an outer layer of sheet steel and an inner plastics layer between which is located the insulating material of a domestic refrigerator. In accordance with another embodiment of the present invention, the material used to form the cabinet of the conventional domestic refrigerator can be replaced by material of the general character indicated in FIG. 9 and formed in accordance with one or more embodiments of the present invention. Clearly this enables embodiments of the present invention to be used in the construction of cool rooms, insulated storage rooms and the like where the laminated material can be used for the walls, floor and ceiling.

Figure 14:
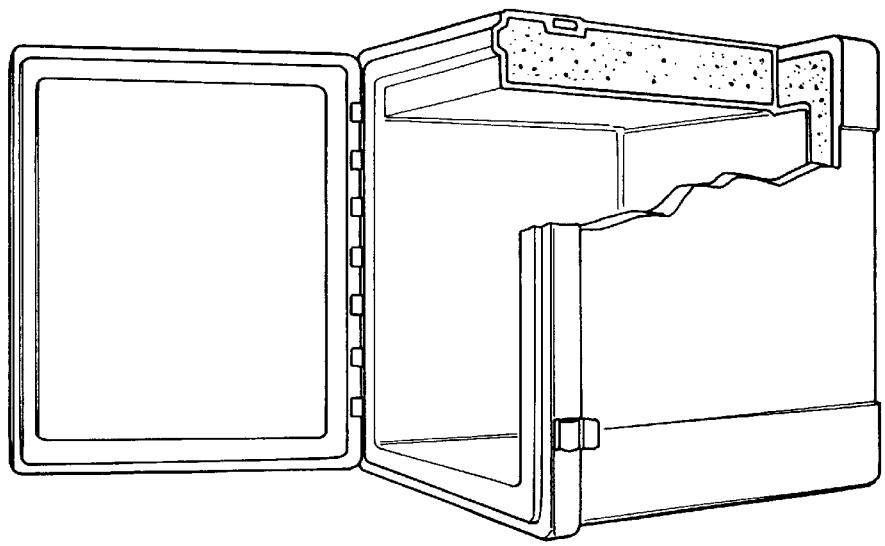
FIG. 14 is a perspective, partially cut away, view of a dual purpose cooling chest or hot box fabricated in accordance with a further embodiment of the present invention.

The concept of utilising the inner body 33 as an insulating material can be adapted in a straight forward manner in order to produce a light weight and portable cooling chest or hot box 51 as indicated in FIG. 14. Here the side walls, base, and lid are formed from expanded polystyrene, for example. Furthermore, the general principle can be extended still further by utilising the inner body 33, not as the thermally insulating material itself, but rather using the well known insulating properties of a vacuum. This is achieved by forming a vacuum between two "walls" each of which is formed from an inner body 33 and an outer covering 15. In this way a light but structurally strong "vacuum flask" of any convenient configuration and size can be fabricated.

Figure 15:
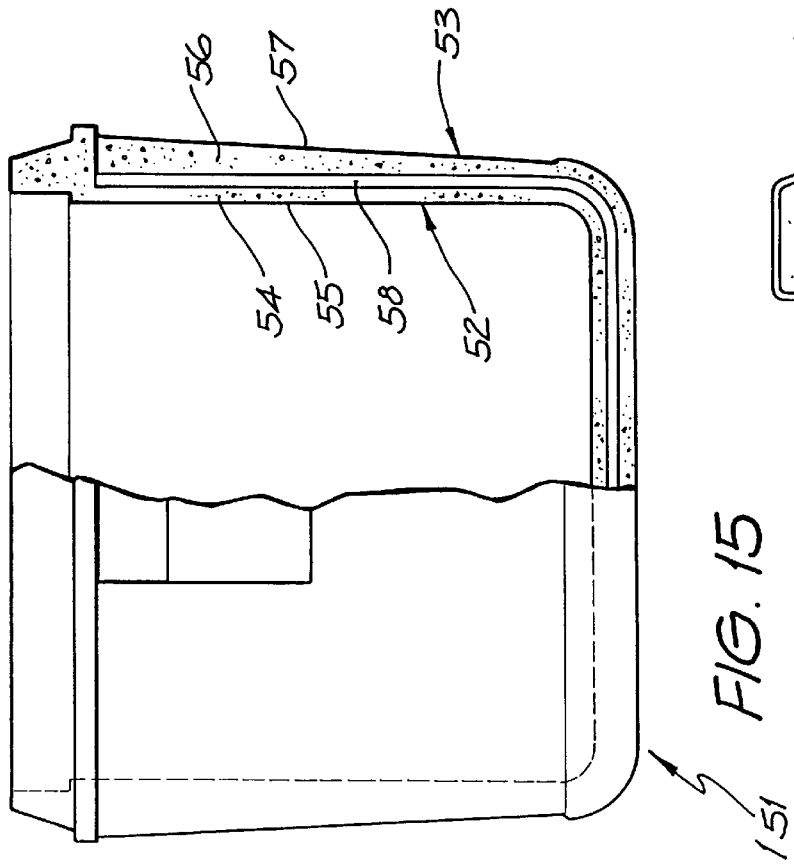
FIG. 15 is a perspective view, partly in section, of one side of the base portion of the cooling chest of FIG. 14.
Figure 16:
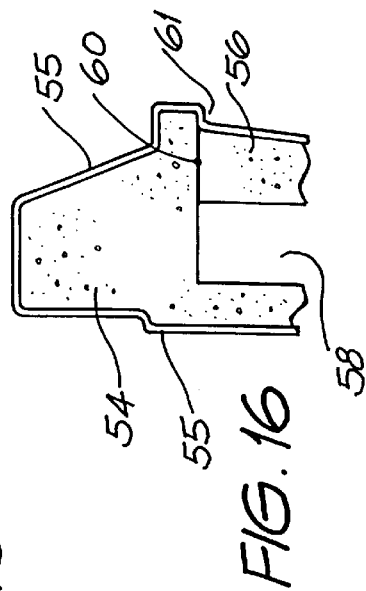
FIG. 16 is an exploded view of a corner portion of FIG. 15.

Referring now to FIG. 15, there is shown, partly in section, such a cooling chest or hot box 151. In FIG. 16 there is shown an enlarged view of a portion of the side wall 50 of FIG. 15. The wall 50 is made from two box like structures comprising an inner box 52 and an outer box 53. The inner box 52 includes a low density EPS foam 54 coated with a sheet 55 as hereinbefore described. The outer box 53 takes the form of a high density EPS foam layer 56 covered with a sheet 57 utilising the methods as hereinbefore described. In between the two boxes 52, 53 there is formed a cavity 58. In one form of cooling chest, the cavity 58 can comprise air, and in a second form of cooling chest, the cavity 58 can be a vacuum. In order to secure the two boxes 52, 53 together, a suitable adhesive can be applied at 60 so as to join the boxes together. Where it is desired to form a vacuum in the cavity 58 the air in cavity 58 can first be pumped out and a sealant applied between the two sheets 55, 57 along the rim 61.

In FIG. 17, there is shown a side view, partly in section, of the cooling chest of FIG. 14. The structure of the base or floor of the coding chest as is better illustrated in the exploded cross-sectional view of FIG. 18. Here it will be seen that the inner box 52 and outer box 53 include a number of protuberances 62, 63 which are designed to abut one another so as to provide support in a manner similar to that described with reference to the pallet of FIGS. 10–13. By means of the protuberances 62, 63 the inner box 52 is supported by the outer box in a stable position.

It is not necessary for a chemical or heat related reaction to occur between the body and covering. For example, some embodiments make use of a heat activated adhesive for ensuring further intimate engagement while other embodiments rely only on the tensioned engagement between the body and covering. Moreover, there a thick covering is to be applied it is often advantageous to first apply a thin covering to protect the body from the heat required to form that second thick covering.

An alternative embodiment of the invention includes a thermal insulator on the exterior surface of body 1 to facilitate formation of thicker coverings or use of lower density EPS. Such coatings include point based materials or less preferably reflective paints and metal foils. Other suitable materials would be known to those skilled in the art.

In this embodiment, the body and the covering provide shock absorption and penetration resistance properties respectively. It will be appreciated, however, that these properties are accentuated due to the unique tensioned engagement between the body and covering.

The covering is produced in a variety of thicknesses, for example, from 0.25 mm up to about 3 mm for helmets. However, much greater thicknesses can be used where greater penetration resistance is required. When using APET a covering thickness of 0.5–0.7 mm is generally sufficient for helmets although thicknesses in the range of 0.1 mm to 10 mm are possible The body is able to be produced from a variety of materials. Where such materials are not sufficiently air permeable the body can be provided with a plurality of spaced apart vents to allow air to be drawn therethrough. However, it is also possible to simply draw air around the body from the space between the body and covering. The latter alternative will provide suitable products although of reduced structural strength in comparison to those embodiments utilising an air permeable body material.

Cycle times for the press apparatus of approximately 20–60 seconds are possible, although additional cooling time is required. There is no need to delay cooling of the covering as would be the case in prior vacuum forming processes. Moreover, it is preferred that immediately following formation of the covering layer that cooling of the helmet occurs by passing air, and preferably cold air, past the helmet. Moreover, it is preferred that the covering is at a temperature well below the melting point of the sheet material before the pressure differential is removed.

The above property of the method according to the invention allows coverings to be selected which would otherwise not be suited to vacuum forming. For example, very thin coverings or materials having a high thermal conductivity. Any shrinkage which may occur provides for a more effective engagement between the covering and body.

The choice of material composition of sheet covering is dependent upon the end use of the product. Insofar as helmets are concerned it has been found that PET is well suited as it offers a covering which is highly resilient. Which has high impact and tensile strengths, is gamma and UV radiation resistant as well as being chemically resistant and which is suitable for accepting surface coats such a paints and adhesives. A highly preferred material is APET.

The helmet formed from the abovementioned method can include further external coatings such as any one of a variety of epoxies or urethanes. Moreover, where the helmet is intended for high impact applications an additional high density shock absorbent layer is applied to the base covering and the epoxy or urethane layer then applied to the exterior side of the high density layer.

In some embodiments, following the formation of the base covering on the body, a second like covering is formed by the same method. It has been found that the intimate engagement between two adjacent 0.75 mm coverings, for example, provides greater structural rigidity than a single 1.5 mm covering.

The second covering will engage the first covering due to the pressure differential and subsequently cool to tensionally engage the first covering. In alternative embodiments the first covering is perforated and includes a temporary mask on its exterior side for preventing passage of air through the perforations. After formation of the first covering the mask is removed. The formation of the second covering can then take advantage of the air permeable nature of the first covering to ensure intimate engagement therebetween.

Use can be made of a heat activated or other adhesive between adjacent layers to further the laminate bonding.

The improved strength that the covering offers the underlying helmet body also makes the process suitable for other applications. For example, suitably shaped polystyrene and other articles can be coated to form building panels for interior walls and partitions, portable coolers, or refrigerator or cool room walls, ceilings, floors and doors. Additionally, where higher density polystyrenes are employed with thicker coverings, articles such as car panels and other automotive components can be produced. It will be appreciated that articles of substantially any size and shape can be formed with a covering in accordance with the invention. Appropriate forming apparatus requires scaling where the size of articles to be formed varies considerably from that of helmets.

According to another aspect of the invention a structural covering is formed over all the surfaces of an article. For example, structural members are covered to provide increased resistance to damage, water or chemical ingress and corrosion or decay. That is, structural members of solid wood, polystyrene, compressed particle board, aluminium or other metals are enveloped in a plastics covering.

In one particular embodiment a first plastics sheet is heated and subsequently brought into engagement with at least one of the surfaces of the structural member. A pressure differential is formed between the first sheet and the member to effect intimate engagement therebetween. A second plastics sheet is then heated and brought into contact with at least one other surface of the member and another pressured differential is formed to effect an intimate engagement of this second sheet with the member. The first and second sheets are configured to overlap and provide a continuous covering on the member. In this embodiment only two sheets form a complete protective covering for the member. However, in alternative embodiments three or more separate overlapping sheets are required. Preferably, a heat activated adhesive is used in the areas of overlap between adjacent sheets.

In circumstances where the member is a rectangular prism, such as a timber beam, it is preferred that the first sheet is brought into engagement with a broad surface of the beam and at least part of both of the two adjacent opposed narrower surfaces. The second sheet is then engaged with the other broad surface of the beam and the narrower surfaces such that it overlaps with the first sheet on both those narrower surfaces.

A material which provides significant advantages when formed into a helmet body or structural member is a product marketed under the trade mark GECET which is manufactured and sold by Huntsman Chemical Corporation under licence from General Electric Company. This material is a blend of polyphenylene oxide and polystyrene impregnated with pentane. A range of densities can be produced. Other particularly preferred materials are expanded polypropylene and that material sold under the trade mark CARIL.

Appropriately shaped GECET, EPS or similar components which include a protective covering in accordance with the present invention have a number of applications. For example, moped helmets, industrial helmets, building panels, ladders, timber substitutes, refrigerator cabinets, traffic barriers and baby capsules.

The use of thick coverings provides a structural member having a very high strength to weight ratio. Additionally the core material can be easily shaped to provide additional strength which will be enhanced by the following of that shape by the subsequently formed covering. These properties make a structural member created in accordance with the present invention useful for wall panels, doors and window frames. That is, an EPS or similar core material including a covering is suitable as a timber or metal substitute.

Figure 19:
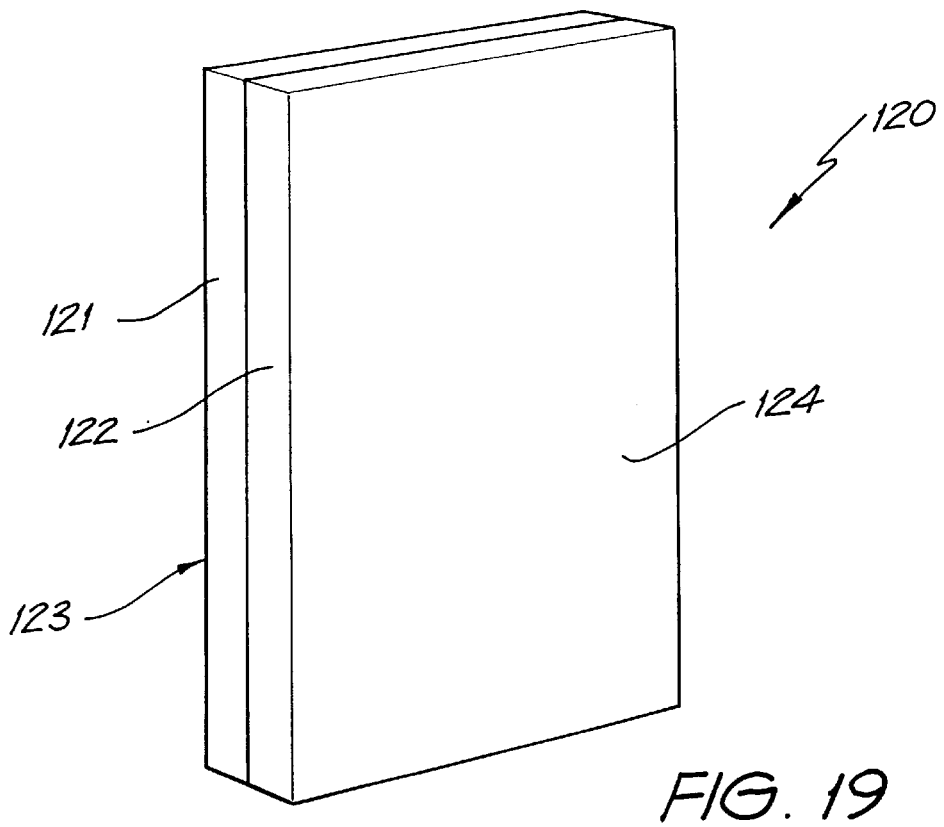
FIG. 19 is a perspective view of a further panel for use in cool room or refrigerator construction and manufactured in accordance with a further embodiment.
Figure 20:
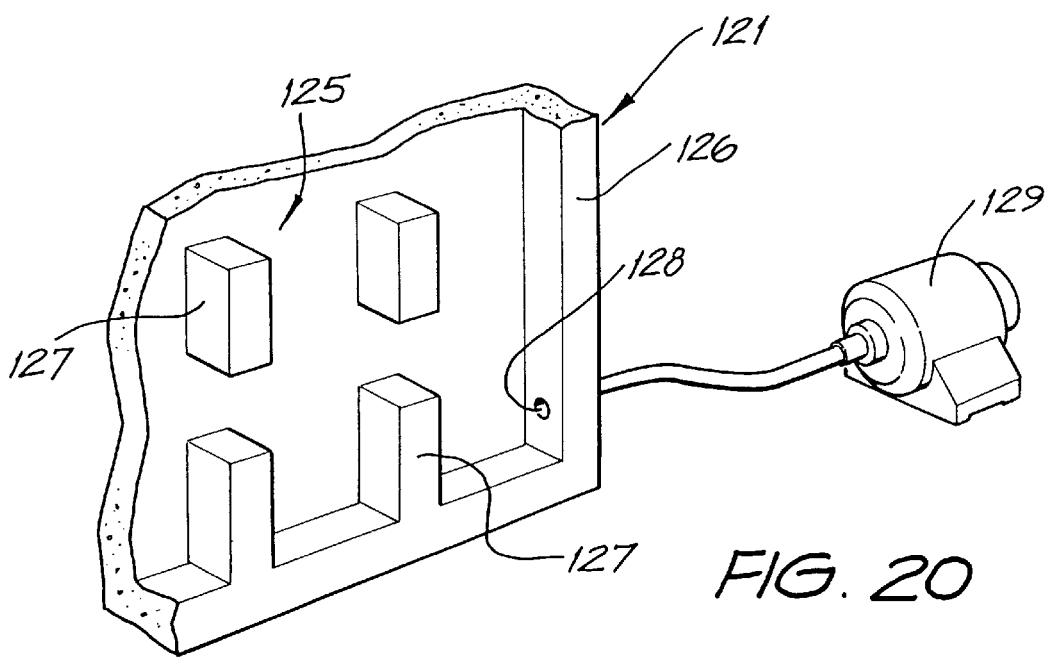
FIG. 20 is a cut away interior perspective view of a portion of one of the two sheets forming the panel of FIG. 19.

One particularly advantageous application of the invention is to panels for use in the construction of temperature conditioned areas such as cool rooms, refrigerators, laboratories or the like. With reference to FIGS. 19 and 20, a panel 120 for the use in construction of a cool room is illustrated. The panel 120 includes two rectangular GECET expanded resin sheets 121 and 122 which are both enveloped and held in abutment by a covering 123.

The sheet 121 is of uniform thickness, however, the sheet 122 includes a substantially planar face 124 and a contoured face 125. The face 125 includes a peripheral lip 126 which perpendicularly extends from the face 125 for abutting the periphery of the adjacent face of sheet 121.

Also perpendicularly extending from the face 125 are a plurality of spaced apart projections 127. These projections are uniformly distributed over the face 125 and preferably are of the same height as the lip 126. Accordingly, the projections also engage the adjacent face of the sheet 121.

Once sheets 121 and 122 are enveloped with covering 123 by way of the process described above, a substantially sealed cavity will be formed between the sheets.

The lip 126 includes an aperture 128 for allowing air to be withdrawn from the cavity or alternatively for temperature conditioned fluid to be passed into the cavity. In the illustrated embodiment a vacuum pump 129 is fluidically connected with the aperture 128 to maintain a substantial vacuum within the cavity to provide the panel 120 with improved insulating properties. The vacuum can be established and the aperture 128 sealed, or alternatively, the pump 129 can be periodically operated to ensure a sufficient vacuum is maintained.

A number of modular panels are fitted together to construct a cool room of desired dimensions. All the panels can be interconnected through respective apertures 128 whereby only a single vacuum pump 129 is required. In addition, the pump 129 can be powered from the refrigeration unit used to condition the air within the cool room.

The existence of the vacuum or partial vacuum within the cavity also facilitate, repair of damage to either of sheets 121 or 122. That is, a patch can be placed over the damaged portion of the sheets and although some form of adhesive is required the action of the vacuum in the cavity will be to further draw the patch into sealing engagement with the surrounding panel.

The invention is similarly applicable to refrigerator cabinets. In addition, however, the vacuum pump can be powered through movement of the door to the cabinet. Alternatively, the motor unit for the existing compressor can be used.

Another application of the invention is to sound barriers along roadways. Modular panels of GECET, EPS or the like including a covering in accordance with the invention are produced. These panels include complimentary locking formations for securing adjacent panels together. The dimensions of such panels are envisaged as being 3 m×1 m×100 mm, however, this can be varied as required.

The protective covering applied provides a substantially vandal proof panel which also facilitates cleaning due to the smooth finish and impermeable nature of the covering. Durability is also enhanced by the use of a UV stable covering.

Figure 21:
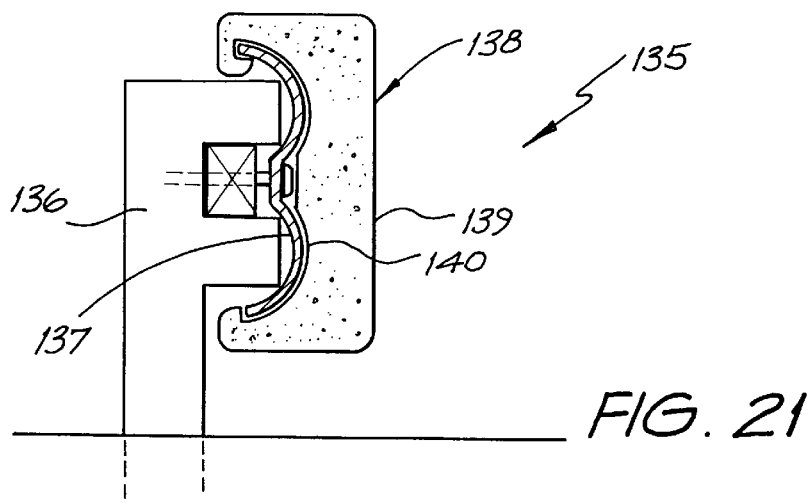
FIG. 21 is a vertical cross-sectional view through a safety barrier constructed in accordance with a still further embodiment of the present invention.

A further embodiment of the invention is the production of safety barriers as shown in FIG. 21. An existing barrier 135 includes a frame 136 for supporting a curved metal barrier 137. An additional energy absorbent barrier 138 is constructed in accordance with the invention and includes a substantially planar outer face 139 and an opposed face 140 which is complimentarily shaped to the barrier 137. The barrier 138 is constructed from a dense EPS or the like and includes an APET or similar skin for providing penetration resistance. The barrier 138 snap locks onto the existing barrier 137 and provides additional protection against injury particularly for motorcyclists and cyclists as the metal components are now effectively encased in an energy absorbent material.

The covering on any of the embodiments described can be tinted or coloured as required. Alternatively, the GECET or EPS core can be painted prior to the application of a substantially transparent covering.

When use is made of an EPS, GECET or similar core material the resultant covered product is particularly suitable to marine craft due to its buoyancy. For example, light weight boat hulls, personal water transport devices, and cabins can be produced. Other articles advantageously manufactured in accordance with the embodiment of the invention include life preservers, boat furniture life boat containers, and snow transport devices such as those sold under the trade mark SKIDO.

Coated GECET is particularly advantageous because of its high melting temperature of this core material. The resultant product is suitable for use in the construction of sterilisers, bench tops, sinks, hot water services and the like.

Embodiments of the invention are also applicable to the production of panels for use with sound boxes for boat generators or motors, swimming pool pumps or other equipment.

Articles produced in accordance with these embodiments invention can include a body constructed from a number of separate components which are subsequently maintained in a predetermined orientation by the covering. In some embodiments the separate body components are initially adhered together. For example, a plurality of EPS panels can be fitted together to form a helmet body prior to the formation of the structural covering over that body.

Alternatively, a block of material such as EPS or GECET is sculptured with a hot knife to produce a surface of a desired shape. A covering is then formed on that surface. This method facilitates the production of prototype and "one-off" articles. It is also possible to mass produce articles, for example, by employing robotics.

Structural members constructed in accordance with the invention are also suitable for yacht masts and motor vehicle bodies.

Further embodiments of the invention utilise bodies of very resilient materials for providing energy absorbing bumpers for motor vehicles.

Helmets produced in accordance with embodiments of the invention can include a structural covering on either of the interior or exterior surfaces or both. Where thick coverings are required the use of the pressure differential is supplemented by mechanical means which facilitate initial shaping of the sheet to the contour of the body being covered.

Embodiments of the invention lend themselves favourably to the use of recycled materials. For example, the sheet or covering can be manufactured from used PET bottles while in some embodiments the body can be comprised of pulp material. One particular field of application where recycled materials are well suited is that of partitioning.

The intimate engagement which is effected between the body and the sheet provides for an article having a high impact resistance. This feature is particularly desirable in the safety helmet field. A helmet covering formed from APET is especially suitable because the covering itself tends to mould against the shape of the impacting article. The intimate engagement between the body and covering facilitates a broad spread of the impact force across the body.

A helmet including an EPS body and APET shell has been tested by the SNELL MEMORIAL FOUNDATION. During such tests a headform covered by the helmet being tested is dropped onto one of a variety of anvils under controlled conditions. The acceleration experienced by the headform is measured and expressed in terms of multiples of gravitational acceleration. Should any reading exceed 300 times such acceleration the helmet is failed. For prior helmets including an EPS body an epoxy coating readings of about 170 to 180 and 200 to 220 respectively for front and side impacts are obtained. A similar EPS body including an APET covering formed in accordance with the present invention results in front and side readings of about 100 and 150 respectively. Accordingly, a significant improvement in impact characteristics are effected.

A further application of the invention is to munition storage containers. A container produced in accordance with the invention provides a high impact resistant, durable store for ammunition of the like. More particularly, the containers effectively isolate the munitions from weathering far in excess of available containers. Moreover, the weight saving over traditional metal or wooden containers is significant.

In another advantageous use of articles constructed with embodiments of the invention, a replacement for the well known multi-layer plywood used to form the mould for concrete casting is disclosed. Such timber formwork is becoming increasingly scarce and therefore expensive. Attempts to replace this timber formwork with sheet plastics materials have not hitherto been successful because the sheet plastics material has not been sufficiently strong to support the heavy wet concrete.

However, in accordance with the present invention a suitable structural strength member for such formwork can be created by expanded polystyrene sheets cut to the required size and shape and then covered with two of the skins or sheets 15. Each sheet 15 covers an opposite side and an overlapping joint is formed, preferably along the edges of the sheet. Thus the correctly sized and shaped article is formed in a single two-step process. Also able to be formed are pre-shaped moulds including curved portions and internal corners. Because the strength is imparted in coating the final article, the need to fabricate complicated moulds in such a way as to be strong is avoided. Instead the mould is fabricated into the desired shape without any consideration needed to be given as to the strength of the fabrication. Instead the necessary strength to the final mould is imparted by the covering.

Various release agents can be added into the plastics of sheet 15, such as silicone. Alternatively, the surface of the formwork can be covered by a thin layer of expendable material such as the clear plastic material sold under the generic name "cling wrap" and sold in Australia under the Registered Trade Mark "GLAD WRAP". This covering is placed over the formwork prior to pouring of the cement or concrete and functions as a release agent.

The concept of the construction of formwork can be readily extended to the construction of walk in refrigeration units or the like which can be constructed from a series of panels, each panel having an interlocking edge with an adjacent panel with special panels being constructed in the form of curved portions and internal corners for the edges or corners of the walk in refrigeration unit. Such a panelled refrigeration unit can then be quickly assembled on site from interlocking panels.

Figure 22:
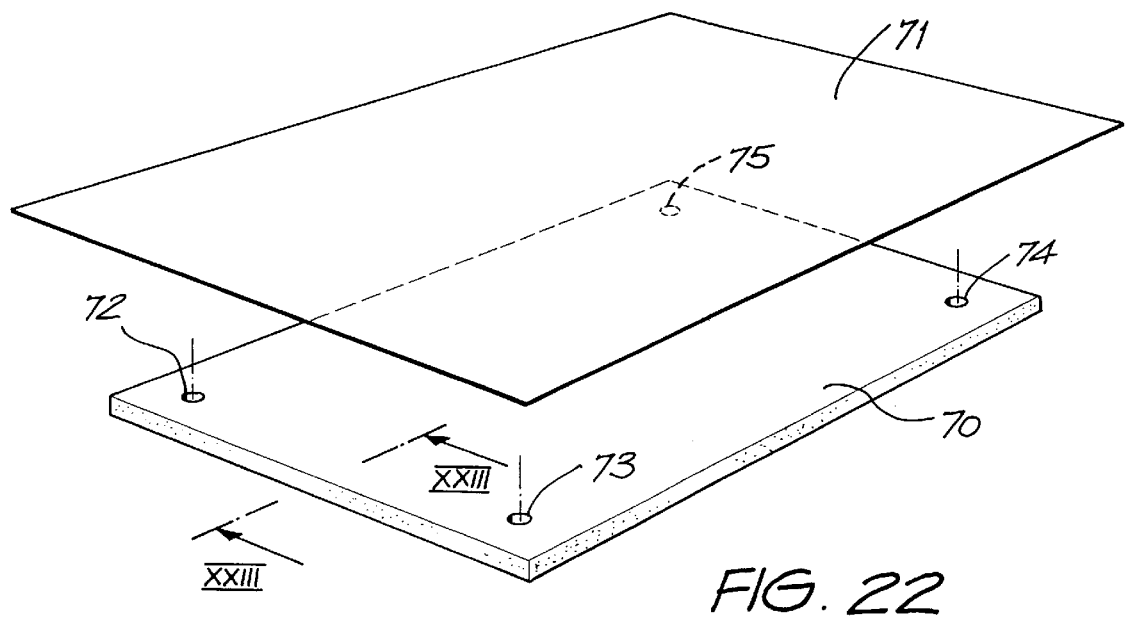
FIG. 22 is a perspective view of a cladding sheet being coated with an external skin.
Figure 23:
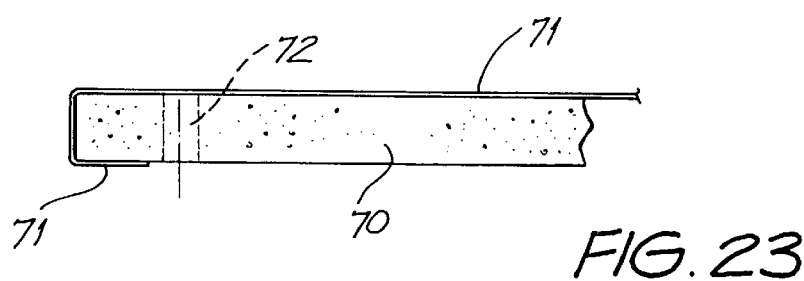
FIG. 23 is a cross-sectional view along the line XIII—XXIII of FIG. 22 but illustrating the cladding sheet after being coated.

Further panelling produced in accordance with an embodiment of the present invention is illustrated in FIGS. 22 and 23. Here a board 70 of cellulosic fibre material—such as that known by the generic term "fibro" in Australia—is to be coated with a single plastics layer 71 using apparatus of a type essentially similar to that illustrated in FIGS. 4–7. The upper surface of the board 70 is preferably coated with a layer of heat activated adhesive. The layer 71 is heated (preferably to a temperature in the range 130°–150° C.) and the board 70 moved relative to the sheet so as to bring same together. Air between the board 70 and layer 71 is extracted as before. In this respect four small apertures 72–75 can be drilled through the board with one of the apertures being located in each corner. These non-essential apertures assist in removal of air between the board 70 and layer 71 and thereby avoid any entrapped air remaining in the form of bubbles in the layer 71.

As illustrated in FIG. 23, the layer 71 being of slightly larger dimensions than the board 70 wraps around the edges of the board 70. If used as wall cladding, for example, one surface of the board 70 is normally left uncoated. However, both surfaces of the board 70 can be coated if desired. The result is a tough, durable and weather proof coating which substantially increases the strength of the board 70. Further the surface(s) of the board 70 to be coated can be coloured or decorated in any desired way thereby substantially increasing the attractiveness of the previously drab board.

The heat activated adhesives used in accordance with the above described method include thermosetting adhesives including phenolic or melamine resins. The adhesive selected should be compatabile with both the inner core and the substrate material. Adhesives which require venting of vapors are contra indicated.

Set out in tabular form below are various combinations of materials able to be used in the above described methods.

| Inner Core | Sheet Material |
| --- | --- |
| Expanded Polystyrene (EPS) | APET - Thermoplastic |
| GECET | PET - Thermoplastic |
| CARIL | PETG - Thermoplastic |
| Polyethylene | Polycarbonate |
| Polyurethane | Polycarbonate/Polyester |
| Recycled Cellulose Material (Paper Cardboard, Timber) | ABS - Polystyrene |
| Resins having mineral fillers inclusing fly ash and aerated cement | HIPS - Polystyrene |
|  | SAN - Polystyrene |
|  | LDPE - Polystryene |
|  | HDPE - Polystyrene |
|  | Polypropylene |
|  | Vinyl |
|  | PMMA - Acrylic |
|  | Cellulose Acetate |
|  | PBT - Thermo Plastic |
|  | PPE - Thermo plastic |
|  | Acetal |
|  | PVC |

It will be understood that each of the inner core materials listed in the left hand column can be coated with each of the sheet materials listed in the right hand column.

The interior surface of the sheet material can be decorated with various paints such as the water based polyester paint sold under the trade name DURABOND. Such paints are preferably filled with alumina trihydrate. As a consequence when such paints are heated water is liberated thereby making the paint self quenching. This helps to protect the inner core material. In addition various fillers, UV absorbers, carbon black and other pigments can be added to the sheet material and in this respect PETG is particularly useful in view of its reluctance to crystalise. Useful properties of the final product include resistance to heat and cold, fatigue resistance and shape restoring memory.

Finally, the present invention is not limited to a single coating or layer. In this connection it is readily apparent that the helmet of FIG. 8 after trimming along the dashed lines in FIG. 8 can be re-located on the former 12 of FIG. 4 and the entire process described in relation to FIGS. 5–8 repeated so as to create a second layer 15 which overlies the "first" layer previously applied.

The foregoing describes only some embodiments of the present invention and modifications, obvious to those skilled in the art, can be made thereto without departing from the scope of the present invention. For examples, surf boards and bogey boards can be constructed in accordance with the present invention.

I claim:

1. A method of forming an article having load bearing capabilities from a shape defining interior member, said shape defining interior member being not inherently load bearing and being at least partially fluid permeable, and at least one external skin, said method comprising the steps of:
   (1) heating a thermoplastic sheet intended to form said external skin;
   (2) bringing said heated sheet alongside said interior member to overlie;
   (3) applying a fluid pressure differential between opposite sides of said shape defining interior member and said thermoplastic sheet to conform said thermoplastic sheet to the shape of said shape defining interior member and mutually engage said shape defining interior member, air trapped between said thermoplastic sheet and said shape defining interior member passing through at least said shape defining interior member; and
   (4) maintaining the fluid pressure differential until said thermoplastic sheet has cooled whereupon tensional forces arise in said thermoplastic sheet in all directions.

2. The method as claimed in claim 1, wherein step (2) comprises moving said shape defining interior member relative to said thermoplastic sheet while heated.

3. The method as claimed in claim 2, further comprising, holding the periphery of said thermoplastic sheet with clamping means and moving said shape defining interior member through the plane of said thermoplastic sheet by relative movement between said shape defining interior member and the clamping means.

4. The method as claimed in claim 3, wherein the clamping means is stationary and said shape defining interior member moves.

5. The method as claimed in claim 1, wherein said shape defining interior member is permeable and the fluid is drawn through said shape defining interior member in response to the pressure differential.

6. The method as claimed in claim 5, wherein said shape defining interior member is an open matrix material.

7. The method as claimed in claim 5, wherein said shape defining interior member includes a plurality of spaced apart vents extending between opposite sides of said shape defining interior member to facilitate conforming of said thermoplastic sheet to said shape defining interior member.

8. The method as claimed in claim 1, comprising applying a second external skin to said shape defining interior member.

9. The method as claimed in claim 8, wherein said second skin is applied to a side of said shape defining interior member opposite to a side to which said heated thermoplastic sheet is applied.

10. The method as claimed in claim 9, wherein opposite sides of said shape defining interior member terminate in a common peripheral edge and said two skins overlap along at least the common peripheral edge.

11. The method as claimed in claim 1, wherein the fluid pressure differential is created by a region of low pressure fluid on a side of the shape defining interior member remote said sheet.

12. The method as claimed in claim 1, including creating the pressure differential by establishing a region of high pressure fluid on an exterior side of the shape defining interior member adjacent said sheet.

13. The method as claimed in claim 11, wherein the fluid comprises a gas.

14. The method as claimed in claim 13, wherein the gas comprises air.

15. The method as claimed in claim 1, wherein said heated thermoplastic sheet tensionally engages shape defining interior member as said shape defining interior member cools.

16. The method as claimed in claim 1, wherein said heated thermoplastic sheet sufficiently raises the temperature of an immediately adjacent surface of said shape defining interior member to allow some softening of said shape defining interior member which, in turn, facilitates a laminate bond between said thermoplastic sheet and shape defining interior member.

17. The method as claimed in claim 1, wherein said shape defining interior member comprises a material selected from the group consisting of expanded thermoplastic materials, timber, compressed timber particles, and cellulosic fibre cement.

18. The method as claimed in claim 17, wherein said shape defining interior member is an expanded thermoplastic material selected from the group consisting of expanded polystyrene (EPS), high density expanded polystyrene (HDEPS), a blend of polyphenylene ether (PPE) and polystyrene (PS) impregnated with pentane, a blend of polyphenylene oxide and pentane impregnated polystyrene, polyethylene, and expanded polypropylene.

19. The method as claimed in claim 1, wherein said external skin is selected from at least one of the group consisting of:

acrylonitrile butadiene styrene (ABS); polyester; styrene; polycarbonate; polyethylene terephthalate (PET); amorphous polyethylene terephthalate (APET); polyethylene terephthalate glycol (PETG); poly vinyl chloride (PVC); polyester/polycarbonate copolymer; and high density polyethylene (HDPE).

20. The method as claimed in claim 1, and including the step of applying a heat activated adhesive to a surface of said shape defining interior member to be engaged with said heated thermoplastic sheet.

21. An apparatus for forming an article having load bearing capabilities from at least one external skin and a shape defining interior member, said shape defining interior member being not inherently load bearing being and at least partially fluid permeable, said apparatus comprising:

(1) a sheet holding device to hold a sheet of plastic material around a periphery of the sheet or adjacent a pair of opposite edges of the sheet;

(2) a former to hold and support the shape defining interior member;

(3) translation means to move said former relative to said sheet holding device, moving the sheet and shape defining interior member together;

(4) heating means to heat a thermoplastic sheet held in said sheet holding device to at least partially soften said sheet;

(5) pressure differential means to create a pressure differential between the sheet and shape defining interior member to conform the sheet to the member, so that air trapped between the sheet and the shape defining interior member passes through the shape defining interior member; and (6) a cooling system facing a surface of the sheet that is not engaged with the shape defining interior member, wherein said pressure differential means maintains the pressure differential until the sheet has cooled whereby tensional forces arise in the sheet in all directions.

22. The apparatus as claimed in claim 21, wherein said cooling system comprises at least one nozzle for delivery of a flow of air.

23. The apparatus as claimed in claim 21, wherein said heating means is reciprocally movable towards and away from said sheet holding device.

24. The article having load bearing capabilities made in accordance with the method of claim 1.

25. The article as claimed in claim 24, comprising a thermally insulative barrier.

26. The article as claimed in claim 26 having an internal void.

27. The article as claimed in claim 26, wherein the void is evacuated.

28. The article as claimed in claim 27, wherein the void is intermittently or continuously evacuated.

29. An article having load bearing capabilities, said article comprising a shape defining interior member and at least one external skin, said shape defining interior member not being inherently load bearing and being at least partially fluid permeable, said external skin being a thermoplastic sheet, wherein said thermoplastic sheet is softened by heating and conformed to the shape of said interior member by applying a fluid pressure differential that draws air trapped between the thermoplastic sheet and at least through said shape defining interior member, the fluid pressure differential being maintained until said thermoplastic sheet has cooled whereby tensional forces arise in said thermoplastic sheet in all directions.

30. The article as claimed in claim 29, wherein said shape defining interior member is permeable.

31. The article as claimed in claim 29, wherein said shape defining interior member is an open matrix material.

32. The article as claimed in claim 29, further comprising a second external skin applied to said shape defining interior member.

33. The article as claimed in claim 32, wherein said second skin is applied to a side of said shape defining interior member opposite to a side to which said thermoplastic sheet is applied.

34. The article as claimed in claim 33, wherein said shape defining interior member comprises opposite sides, the opposite sides terminate in a common peripheral edge, said two skins overlap along at least said common peripheral edge.

35. The article as claimed in claim 29, wherein said thermoplastic sheet tensionally engages said shape defining interior member after being cooled.

36. The article claimed in claim 29, wherein said heated thermoplastic sheet sufficiently raises the temperature of an immediately adjacent surface of said shape defining interior member to soften said shape defining interior member which, in turn, facilities a laminate bond between said thermoplastic sheet and shape defining interior member.

37. The article as claimed in claim 29, wherein said shape defining interior member comprises a material selected from the group consisting of expanded thermoplastic materials, timber, compressed timber particles, and cellulosic fibre cement.

38. The article as claimed in claim 29, wherein said expanded thermoplastic material is selected from the group consisting of expanded polystyrene (EPS), high density expanded polystyrene (HDEPS), a blend of polyphenylene ether (PPE) and polystyrene (PS) impregnated with pentane, a blend of polyphenylene oxide and pentane impregnated polystyrene, polyethylene, and expanded polypropylene.

39. The article as claimed in claim 29, wherein said external skin is selected from the group consisting of at least one of: acrylonitrile butadiene styrene (ABS); polyester; styrene; polycarbonate; polyethylene terephthalate (PET); amorphous polyethylene terephthalate (APET); polyethylene terephthalate glycol (PETG); poly vinyl chloride (PVC); polyester/polycarbonate copolymer; and high density polyethylene (HDPE).

40. The article as claimed in claim 29, wherein a heat activated adhesive is interposed between said shape defining interior member and said thermoplastic sheet.

41. The article as claimed in claim 29, wherein said article is a bicycle helmet.

42. The article as claimed in claim 29, wherein said article is a panel for use in a cooling chest, cool room, or refrigerator.

43. The article as claimed in claim 29, wherein said article is a safety barrier.

44. The article as claimed in claim 29, wherein said article is a cladding sheet.

45. The article as claimed in claim 29, wherein said article is a structural member of a pallet.

* * * * *

UNITED STATES PATENT AND TRADEMARK OFFICE
CERTIFICATE OF CORRECTION

PATENT NO. : 5,833,796
DATED : November 10, 1998
INVENTOR(S) : Matich

It is certified that error appears in the above-identified patent and that said Letters Patent is hereby corrected as shown below:

Column 18, Line 16, change "26" 2nd occurrence to

--25--.

Signed and Sealed this

Sixteenth Day of March, 1999

Q. TODD DICKINSON

Attest:

Attesting Officer

Acting Commissioner of Patents and Trademarks